United States Patent
Jackson et al.

(10) Patent No.: US 10,814,262 B2
(45) Date of Patent: Oct. 27, 2020

(54) FLOW CONTROL DEVICE FOR A SELF-CLEANING GAS FILTRATION SYSTEM

(71) Applicant: AAF LTD., Northumberland (GB)

(72) Inventors: Paul Jackson, Northumberland (GB); Mark Smith, Northumberland (GB); Rodrigo Nessi, Northumberland (GB)

(73) Assignee: AAF LTD., Northumberland (GB)

( * ) Notice: Subject to any disclaimer, the term of this patent is extended or adjusted under 35 U.S.C. 154(b) by 120 days.

(21) Appl. No.: 15/553,397

(22) PCT Filed: Feb. 24, 2016

(86) PCT No.: PCT/EP2016/053845
§ 371 (c)(1),
(2) Date: Aug. 24, 2017

(87) PCT Pub. No.: WO2016/142172
PCT Pub. Date: Sep. 15, 2016

(65) Prior Publication Data
US 2018/0071669 A1    Mar. 15, 2018

(30) Foreign Application Priority Data

Mar. 6, 2015 (GB) .................................. 1503890.4

(51) Int. Cl.
*B01D 46/00* (2006.01)
*B01D 46/24* (2006.01)
*B05B 1/00* (2006.01)

(52) U.S. Cl.
CPC ...... *B01D 46/0068* (2013.01); *B01D 46/2411* (2013.01); *B05B 1/005* (2013.01)

(58) Field of Classification Search
CPC ............... B01D 46/00; B01D 46/0068; B01D 46/2411; B05B 1/005
(Continued)

(56) References Cited

U.S. PATENT DOCUMENTS 3,594,992 A * 7/1971 Carr .................... B01D 46/0043
55/302
5,562,746 A * 10/1996 Raether .............. B01D 46/0005
55/302

(Continued)

FOREIGN PATENT DOCUMENTS

CA          624264          7/1961
EP         1647319          4/2006
(Continued)

OTHER PUBLICATIONS

International Search Report and Written Opinion issued by the European Patent Office regarding International Application No. PCT/EP2016/053845 dated May 23, 2016, 10 pages.
(Continued)

*Primary Examiner* — T. Bennett McKenzie
(74) *Attorney, Agent, or Firm* — Haynes and Boone, LLP

(57) ABSTRACT

A flow control device for controlling fluid flow into a filter cartridge. The flow control device comprises a hollow body comprising a fluid flow inlet and a fluid flow outlet. The flow control device is configured to split fluid flowing toward the filter cartridge into at least two distinct flow streams, a first distinct flow stream of the at least two distinct flow streams being a flow stream which flows into the hollow body through the fluid flow inlet and out of the hollow body through the fluid flow outlet, and a second distinct flow stream of the at least two distinct flow streams being a flow stream which does not flow into the hollow body through the fluid flow inlet and out of the hollow body through the fluid flow outlet.

19 Claims, 10 Drawing Sheets

(58) Field of Classification Search
USPC .............................. 55/282–305; 95/278–280
See application file for complete search history.

(56) References Cited

U.S. PATENT DOCUMENTS

| | | | | |
|---|---|---|---|---|
| 6,129,852 A | * | 10/2000 | Elliott .................. | B01D 29/114 |
| | | | | 210/791 |
| 2005/0252178 A1 | | 11/2005 | Richard | |
| 2008/0022856 A1 | * | 1/2008 | Clements ........... | B01D 46/0021 |
| | | | | 95/280 |

FOREIGN PATENT DOCUMENTS

| | | |
|---|---|---|
| WO | WO2006/105438 | 10/2006 |
| WO | WO 2009119925 A1 | 10/2009 |

OTHER PUBLICATIONS

United Kingdom Intellectual Property Office, Combined Search and Examination Report for Application No. GB1503890.4, dated Oct. 21, 2015, 3 pages.

Office Action issued by the European Patent Office regarding European Application No. 16 705 066.6 dated Sep. 4, 2019, 6 pages.

\* cited by examiner

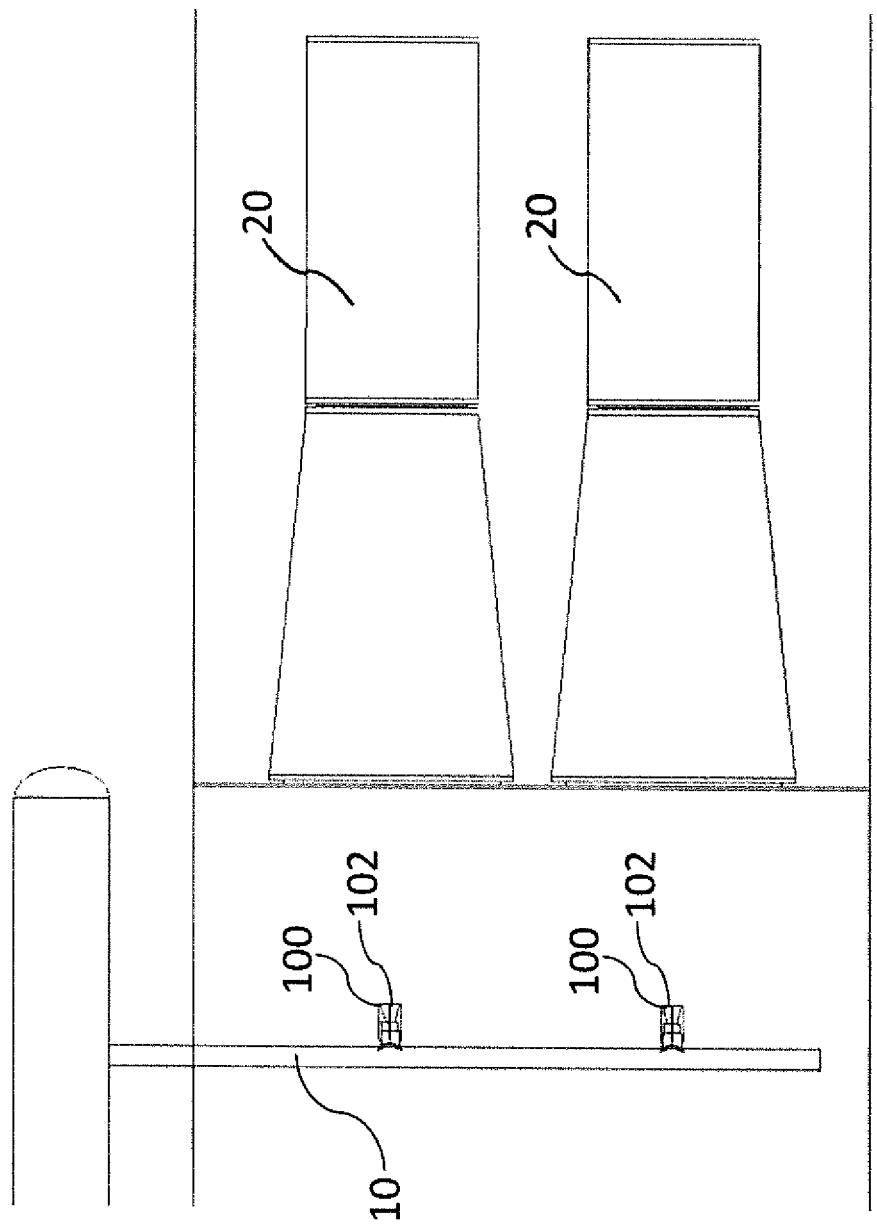

FLOW CONTROL DEVICE FOR A SELF-CLEANING GAS FILTRATION SYSTEM

CROSS-REFERENCE TO RELATED APPLICATIONS

This application is a United States national phase application of International Application No. PCT/EP2016/053845, filed Feb. 24, 2016, which claims priority to United Kingdom Application No. GB1503890.4, filed Mar. 6, 2015, the entire disclosures of which are hereby incorporated herein by reference.

FIELD OF THE INVENTION

The present invention relates generally to flow control devices, and more particularly to flow control devices for controlling a cleaning gas flow into filter cartridges of a process gas filtration system.

TECHNICAL BACKGROUND

It is essential to effectively filter intake gas supplied to turbine blades in power generation systems. One common example of an intake gas is air. Specifically, effective filtration of intake air is necessary to prevent fouling and/or erosion of the compressor blades of the turbine. For example, intake of coarse mineral dust may erode the blades of the turbine, or fine sticky carbon smoke dust could create deposits on the blades. In either case, the profile of the blade is changed from that designed for optimum operation, as a result of which turbine efficiency and power output is reduced.

Therefore, power generation systems usually require a filtration system to perform this necessary filtration of the intake air. However, the inclusion of the filtration system creates a further problem. Specifically, if the filters of the filtration system accumulate large quantities of contaminates over a period of prolonged filtration, a pressure drop may occur at the filter. The pressure drop of the filter reduces the maximum power output obtainable by the turbine. The filters then have to be replaced, which becomes costly. To aid in replacement, the filters are sometimes formed as a filter cartridge, which cartridge is a modular unit, comprising a filter medium, that can be easily attached or removed from the air filtration system when the cartridge needs to be replaced.

To reduce the cost of replacing the filter cartridges, power generation systems may be fitted with a "self-cleaning" air filtration system, to extend the functional lifetime of the filter cartridges. Self-cleaning air filtration systems function by applying a reverse pulse jet of clean air, acting as a cleaning gas, to the filter cartridges, in an opposite direction to the usual direction of process air flow through the filter cartridges, to remove accumulated contaminates from the filter media of the filter cartridges. The pulse jet of clean air is usually discharged from a compressed air reservoir, via pulse pipes, to the "clean" side of the filter cartridge, from which clean side the filtered process air is output during normal operation. The clean air may be also be derived from compressed atmospheric air or compressed clean process air. Alternatively, another cleaning gas, such as compressed dry nitrogen gas, may be used.

The pulse pipes must be configured so as to provide minimal obstruction of the normal flow of filtered air from the cartridge. Therefore, the number and size of the pulse pipes must be kept to a minimum, and a high pulse pressure is used to provide an adequate flow rate of cleaning air to the cartridge.

However, through intensive experimentation and analysis of known self-cleaning systems, the inventors have discovered a problem with the existing known pulse cleaning devices. Specifically, the inventors found that known pulse cleaning devices are ineffective at cleaning all of the filtration surfaces of the filter cartridges.

As shown in FIG. 3, a known pulse cleaning device comprises a pulse pipe 10 including a nozzle which directs a reverse pulse jet of air 30 to the distal end, in the direction of flow of the reverse pulse jet of air, of the filter cartridge 20. This reverse pulse jet of air is directed in an opposite direction 30 to the direction of flow of the process air flow 40 during normal operation. As such, the proximal end, in the direction of flow of the reverse air, of the filter cartridge 20 is ineffectively cleaned. Furthermore, nozzles which direct the pulse jet of air to the distal end of the filter cartridge 20 cause the proximal end of the filter cartridge 20 to act as an aspirator, which causes contaminates present in the filter cartridge to be urged further into the filter media of the filter cartridge 20, instead of these contaminates being removed from the filter media of the filter cartridge.

Devices developed to rectify the above issue focus on re-directing the reverse pulse jet of air to the proximal end of the filter cartridge, as shown in FIG. 4. These devices may include a re-direction device 50 which re-directs the reverse pulse jet of air onto internal surfaces of the proximal end of the filter cartridge 20. However, these devices do not effectively remove contaminates from the filter media at the distal end of the filter cartridge 20.

The above-described problems also arise in situations in which other process gases besides intake air must be filtered, and in which other cleaning gases besides air are used to clean filter media. For example, the problems arise also in the context of filtration of inlet air for clean rooms to maintain a low particle count, for the filtration of ventilation air to remove allergens or pollution in domestic or commercial ventilation systems to improve comfort of occupants, or in the filtration of exhaust air from industrial processes before environmental discharge to satisfy regulatory requirements.

As can be seen above, there is therefore a need for a self-cleaning gas filtration system which can effectively clean the filtration surfaces of both the proximal and distal ends of a filter cartridge.

SUMMARY

Accordingly, the preferred embodiments of the present invention allow for the provision of a self-cleaning gas filtration system that avoids the above-mentioned drawbacks, and allows for effective cleaning of the filtration surfaces of both the distal and proximal ends of a filter cartridge in a self-cleaning air filtration system.

According to a first aspect, there is provided a flow control device for controlling fluid flow into a filter cartridge, the flow control device comprising: a hollow body comprising a fluid flow inlet and a fluid flow outlet, wherein the flow control device is configured to split fluid flowing toward the filter cartridge into at least two distinct flow streams, a first distinct flow stream of the at least two distinct flow streams being a flow stream which flows into the hollow body through the fluid flow inlet and out of the hollow body through the fluid flow outlet, and a second distinct flow stream of the at least two distinct flow streams being a flow stream which does not flow into the hollow body through the fluid flow inlet and out of the hollow body through the fluid flow outlet.

By splitting the reverse pulse jet of air into two distinct flow streams, it is possible to ensure that the filtration surfaces of both the proximal and distal ends of the filter cartridge are effectively cleaned.

In an embodiment, the fluid flow outlet has a larger area than the fluid flow inlet.

By sizing the fluid flow outlet to be larger than the fluid flow inlet, it is possible to control the divergence of the first distinct flow stream such that it effectively cleans the filtration surfaces at the distal end of the filter cartridge. The distal end of the filter cartridge is the distal end in the direction of the reverse pulse jet of air.

In an embodiment, the hollow body comprises at least one wall, wherein the at least one wall diverges outwardly from the fluid flow inlet to the fluid flow outlet.

The provision of at least one diverging wall which diverges outwardly from the fluid flow inlet to the fluid flow outlet allows for the first distinct flow stream to be directed onto the internal surfaces of the distal end of the cartridge in the direction of the reverse pulse jet of air in a smooth manner, to minimise turbulent flow, which could reduce the effectiveness of the cleaning of the filtration surfaces of the filter cartridge.

Furthermore, the at least one wall may diverge to have a conical or pyramidal shape.

By providing a hollow body with tapering walls in a conical or pyramidal shape, an especially advantageous flow control device may be achieved, which ensures that the first and second distinct flow streams are applied to the internal surfaces of the filter cartridge in a symmetrical manner, such that the filtration surfaces of the filter cartridge may be cleaned effectively, irrespective of the radial position of the location of the filtration surface.

In an embodiment, the hollow body has rotational symmetry about a central axis through the centre of the hollow body, to allow for symmetrical cleaning of the filtration surfaces of the filter cartridge.

In an embodiment, the fluid inlet is disposed at an upstream end of the hollow body in the direction of fluid flow. In this instance, the direction of fluid flow refers to the direction of fluid flow of the reverse pulse jet of air. The term "upstream end of the hollow body" is used here to mean the part of the hollow body that is most upstream in the direction of the reverse pulse jet of air. The term "upstream end of the hollow body" does not refer to an intermediate location between the upstream and downstream ends of the hollow body.

By providing the fluid inlet at an upstream end of the hollow body in the direction of fluid flow, the first distinct flow stream may be formed from a sufficient enough volume of air to effectively clean the distal portion of the filter cartridge. It is noted that fluid inlets that are disposed mid-way between the upstream and downstream ends of the body are less preferable, since the reduced volume of air that may pass through these types of fluid inlets reduces the effectiveness of the cleaning of the filtration surfaces of the filter cartridge.

In an embodiment, the fluid outlet is disposed at a downstream end of the hollow body, in the direction of fluid flow. In this instance, the direction of fluid flow refers to the direction of fluid flow of the reverse pulse jet of air. In this case, the term "downstream end of the hollow body" is utilised to mean at the most downstream end of the hollow body, in the direction of the reverse pulse jet of air. The term "downstream end of the hollow body" does not relate to an intermediate location between the upstream and downstream ends of the hollow body.

In an embodiment, the fluid flow inlet and the fluid flow outlet are both positioned on a central axis of symmetry of the hollow body. The hollow body may have rotational symmetry about this central axis, as outlined above. By positioning both the fluid flow inlet and the fluid flow outlet on a central axis of symmetry of the hollow body, turbulence and/or drag effects can be negated, thereby increasing the effectiveness of the cleaning of the filter cartridge.

In an embodiment, the fluid flow inlet and the fluid flow outlet are sized and positioned such that the first and second distinct flow streams remain substantially distinct at locations downstream to the flow control device in the direction of fluid flow. In this instance, the direction of fluid flow refers to the direction of fluid flow of the reverse pulse jet of air.

As used herein, the term "substantially distinct" defines that the first and second distinct flow streams may have different velocity vectors, or different divergences, but may still be in contact with the other flow stream along a boundary between the two flow streams. The term "substantially distinct" defines that these two distinct flow streams do not substantially re-combine into a single flow stream in locations downstream to the flow control device before coming into contact with the filtration surfaces of the filter cartridge.

By providing a flow control device that forms distinct flow streams that remain distinct distal of the device, the amount of cleaning air supplied to the distal and proximal ends of the filter cartridge can be well-controlled.

In an embodiment, the fluid flow outlet is of a sufficient size to allow the first distinct flow stream to have a sufficient volume for cleaning a distal end of the filter cartridge in the direction of fluid flow. In this instance, the direction of fluid flow refers to the direction of fluid flow of the reverse pulse jet of air.

In an embodiment, the hollow body has dimensions to allow the second distinct flow stream to have a sufficient volume for cleaning a proximal end of the filter cartridge in the direction of the reverse pulse jet of air.

By sizing the fluid flow outlet or the dimensions of the hollow body to allow for the first or second distinct flow streams to have a sufficient volume for cleaning, the amount of pressure applied to the distal or proximal ends of the filter cartridge to ensure effective cleaning can be controlled.

In an embodiment, the fluid flow inlet and the fluid flow outlet are configured such that the first distinct flow stream is less divergent than the second distinct flow stream.

By configuring the sizes of the fluid flow inlet and fluid flow outlet such that the first distinct flow stream is less divergent than the second distinct flow stream, the filtration surfaces at the distal end of the filter cartridge in the direction of fluid flow can be more effectively cleaned, since the first distinct flow stream has an advantageously straightened profile.

In an embodiment, the flow control device is integrally formed with a pulse nozzle. By forming the flow control device integrally with the pulse nozzle, assembly of the gas filtration system can be made simpler.

Alternatively, in an embodiment, the flow control device comprises retaining means to secure the flow control device over the outlet of a pulse nozzle. By providing retaining means adapted to secure the flow control device over the outlet of a pulse nozzle, existing pulse nozzles can be fitted with the flow control devices according to the present invention.

In an embodiment, the flow control device further comprises a housing disposed around the flow control device. Provision of a housing disposed around the flow control device may be used to dampen vibrations of the flow control device.

In a further embodiment, the flow control device comprises a housing disposed around the hollow body, said housing comprising at least one aspirator.

Provision of an aspirator in a housing surrounding the hollow body, or alternatively, in the flow control device itself, increases the overall volume of air available for cleaning the filter cartridge, by drawing air from the surroundings around the flow control device into the flow control device, which air then forms part of the first and/or second distinct flow streams. In one embodiment, the aspirator is arranged to supply aspirated air to a fluid flow upstream of the fluid flow inlet.

In a second aspect of the present invention combinable with the above aspects and embodiments, there is provided a self-cleaning process gas filtration system, the system comprising a filter cartridge arranged for filtering a process gas flow flowing in a process direction; a pulse pipe comprising a pulse nozzle, the pulse pipe configured to supply a reverse pulse of cleaning gas through the pulse nozzle in a reverse direction through the filter cartridge relative to the process direction; and a flow control device for controlling the flow of the pulse of cleaning gas, wherein the flow control device is configured to split the pulse of cleaning gas into at least two distinct flow streams.

In an embodiment, the self-cleaning process gas filtration system comprises a support for mounting the filter cartridge.

In an embodiment, the flow control device is configured such that the pulse of cleaning gas controlled by the flow control device exerts a substantially uniform pressure to internal surfaces of the proximal and distal ends of the filter cartridge.

By providing a substantially uniform pressure to internal surfaces of the filter cartridge, negative pressure regions are avoided in the filter cartridge, thereby preventing contaminates being driven further into the filter cartridge.

According to a third aspect of the present invention combinable with the above aspects and embodiments, there is provided a method of cleaning a filter cartridge using a flow control device as defined above.

According to a fourth aspect of the present invention, there is provided a gas filtration system comprising a flow control device as defined above.

BRIEF DESCRIPTION OF THE DRAWINGS

In order to better understand the present invention, and to show how the same may be carried into effect, reference will be made, by way of example only, to the following drawings, in which:

FIG. 10 shows a pulse pipe with multiple pulse jet nozzles comprising flow control devices in accordance with the present invention.

DETAILED DESCRIPTION

The following description illustrates some exemplary embodiments of the disclosed invention in detail. Those skilled in the art will recognise that there are numerous variations and modifications of this invention that are encompassed by the scope of the appended claims. Accordingly, the description of a certain exemplary embodiment or of specific features thereof should not be deemed to limit the scope of the present invention.

Figure 1:
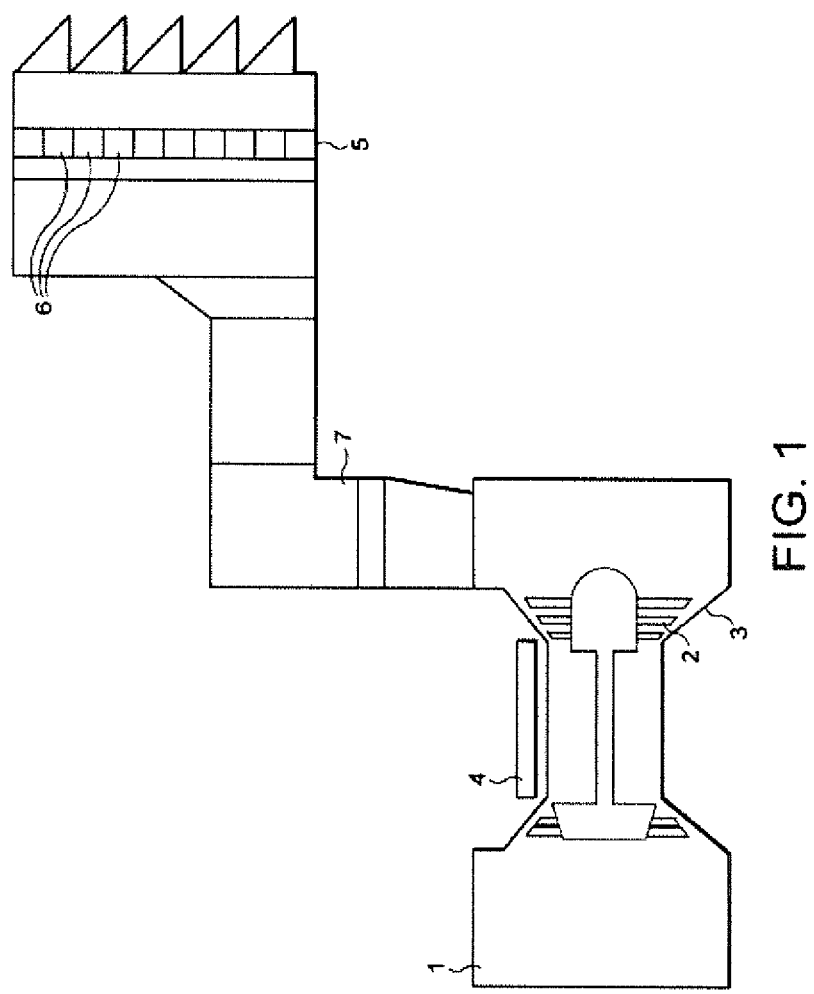
FIG. 1 shows a schematic side view of a gas turbine.

FIG. 1 shows a gas turbine 1 in a schematic side view. The gas turbine 1 has rotor blades 2 which are caused to rotate within a combustion part 3 of the turbine powered by gas from a fuel supply line 4 so as to output electrical power at an output line (not shown). Air (or process gas) input to the combustion part 3 passes initially into an inlet duct 5 and then through a filter matrix assembly 6 in the inlet duct, so that dirt, contaminates and other particulate matter contained in the air entering the inlet duct 5 are prevented from reaching the turbine blades 2. The cleaned air flows through an air transition duct 7 to the gas turbine air intake, thereby defining the process gas flow.

Figure 2:
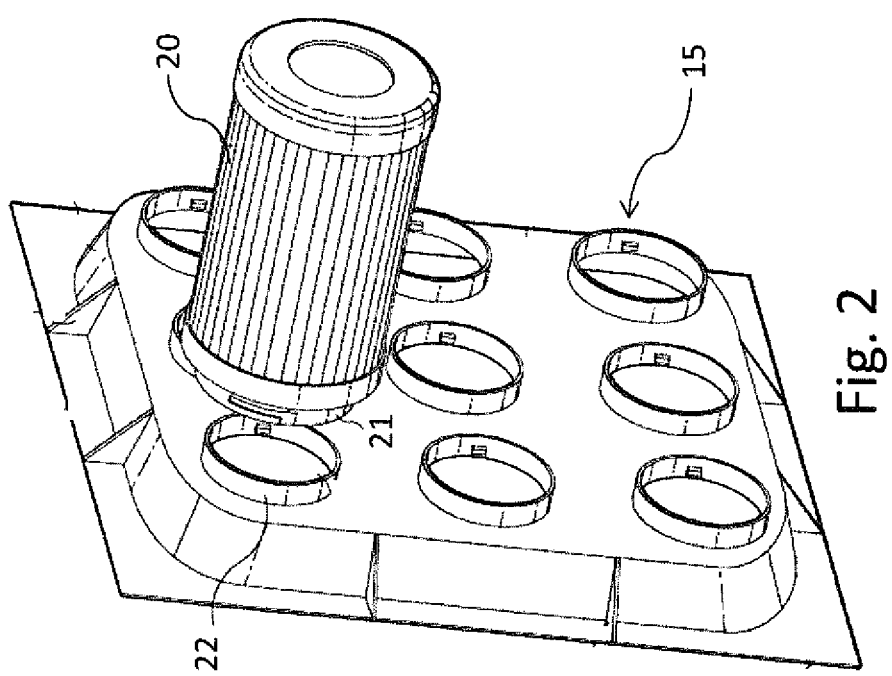
FIG. 2 shows a front perspective view, from the side and above, of a cylindrical filter cartridge about to be removably fitted to a support.

The filter matrix assembly 6 may comprise a multiplicity of multi-stage filters, each comprising an upstream (in the process gas direction), relatively coarse, pre-filter device and a downstream (in the process gas direction), relatively fine, final filter device, which removes finer particulates that have passed through the pre-filter device. Other intermediate filters may be included between the upstream and downstream filters. In a preferred arrangement, a plurality of filter elements 20 are arranged on a support 15, as shown in FIG. 2. Each filter element provides one or more portions of a filter medium through which air introduced to the filter element must pass before exiting the filter element. Each filter element is preferably in the form of a cartridge or canister, to facilitate easy handling of old and new filter elements when an old filter element needs to be replaced.

FIG. 2 shows a cylindrical filter cartridge 20 about to be removably fitted to a mounting plate 15. Filter cartridge 20 is in the form of a cylinder, open at one end and closed at the other. The walls of the cylinder include, or are made from, a layer or layers of a filter medium, such that air passing from an outside of the filter cartridge must pass through the filter medium before exiting the cartridge through the open end. Some configurations provide a layer of filter medium to form all or part of the closed end, also, to increase the surface area of filter medium through which the air can pass. Other forms of filter cartridge may also be contemplated, without restriction, among those known in the art.

As shown in FIG. 2, in order to hold each filter cartridge in position, the filter cartridge may be provided with an engagement means, here a bayonet connector 21 at its open proximal end, which engages with a complementary bayonet fitting 22 on the support 15. With this arrangement, it is possible to rapidly and securely mount each filter cartridge 20 on the support 15, as well as to remove it from the support 15 when the filter cartridge 20 needs to be replaced. Other mounting configurations may be known in the art, and the present invention is also applicable thereto.

For example, a preferred mounting configuration comprises one or more filter cartridges mounted on a tubeplate. The one or more filter cartridges may be mounted onto mandrels attached to the tubeplate. The filter cartridges may be secured to the tubeplate by end caps being compressed onto the end of the filter, which end caps are tightened to prevent process air flow from bypassing the filter media of the filter cartridge.

In order to reduce the number of occasions at which a filter cartridge must be replaced, a self-cleaning gas filtration system may be used. A known self-cleaning gas filtration is shown in FIG. 3.

Figure 3:
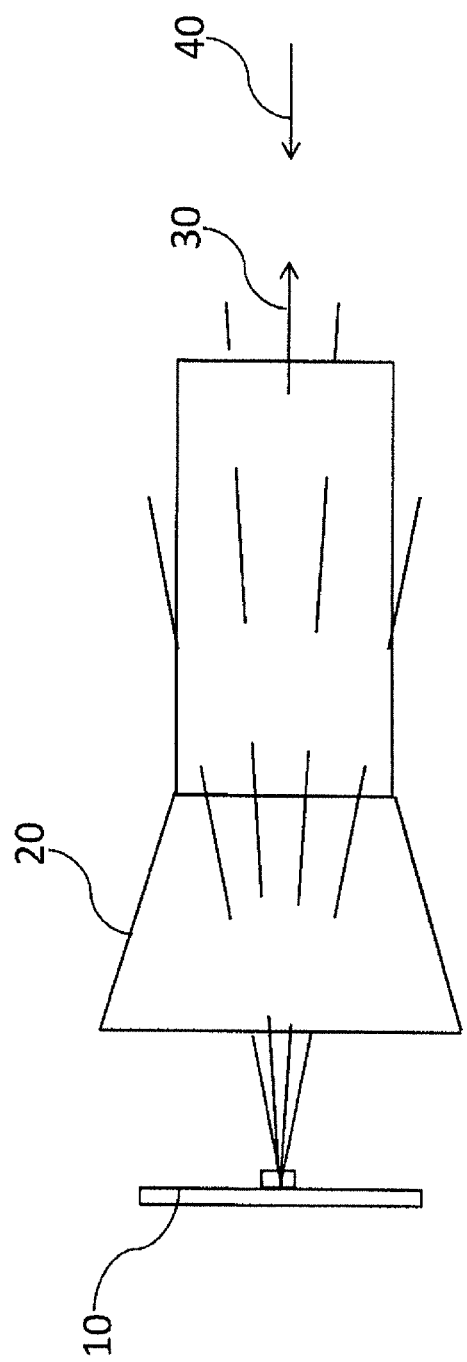
FIG. 3 shows a known pulse jet nozzle pulsing a reverse jet of air through a filter cartridge.

In FIG. 3, a pulse pipe 10 supplies a reverse pulse jet of cleaning air, in a direction 30 opposite to the direction of usual process gas or air flow 40, to remove accumulated contaminates from the filter media of the filter cartridge 20. The divergence of the pulse jet of cleaning air is shown through the use of dashed lines. The pulse jet may be discharged from a compressed air reservoir via pulse pipe 10 to the proximal side of the filter cartridge 20 through orifices in the support 15. As can be seen in FIG. 3, the proximal portion of the filter cartridge 20, i.e., the filtration surfaces of the filter cartridge closest to the pulse pipe, are not effectively cleaned since the reverse pulse jet of clean air is not directed toward these proximal surfaces.

Figure 4:
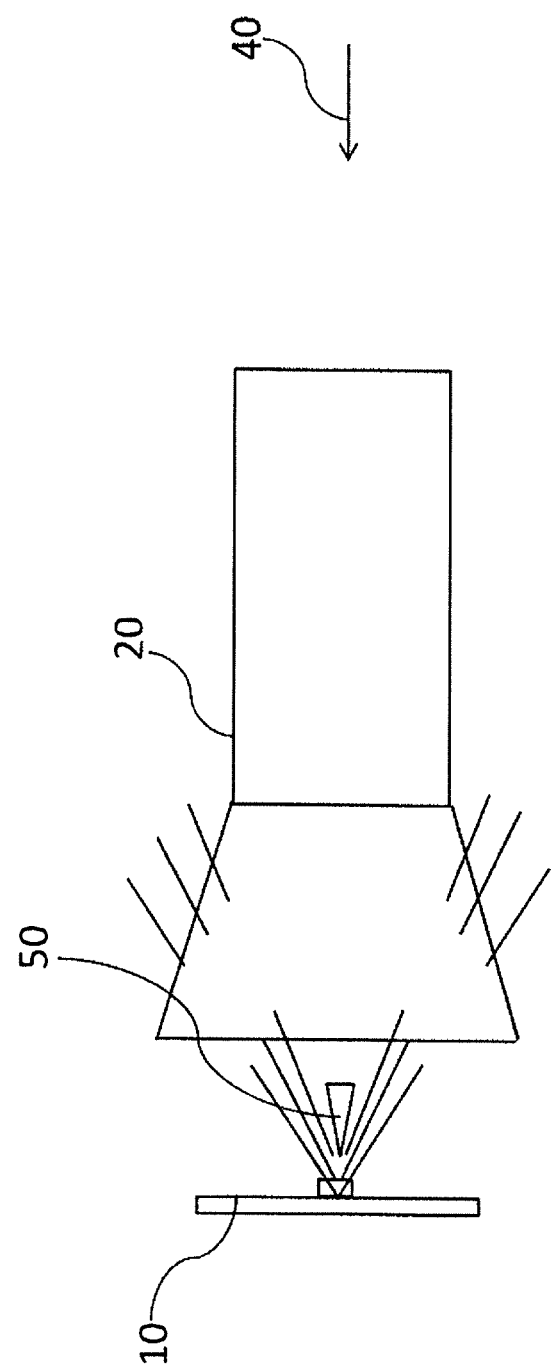
FIG. 4 shows a known pulse jet nozzle comprising a re-direction member pulsing a reverse jet of air through a filter cartridge.

Another known self-cleaning gas filtration system is shown in FIG. 4. In this Figure, a re-direction member 50 having the form of a solid cone is disposed in front of the pulse jet nozzle of the pulse pipe 10. The re-direction member 50 re-directs the pulse jet of clean air, shown using dashed lines, to the internal surfaces of the proximal end of the filter cartridge. However, such pulse jet nozzles with re-direction members merely transfer the area that is inefficiently cleaned to the distal end of the filter cartridge 20, i.e., the filtration surfaces of the filter cartridge furthest from the pulse pipe 10.

Figure 5:
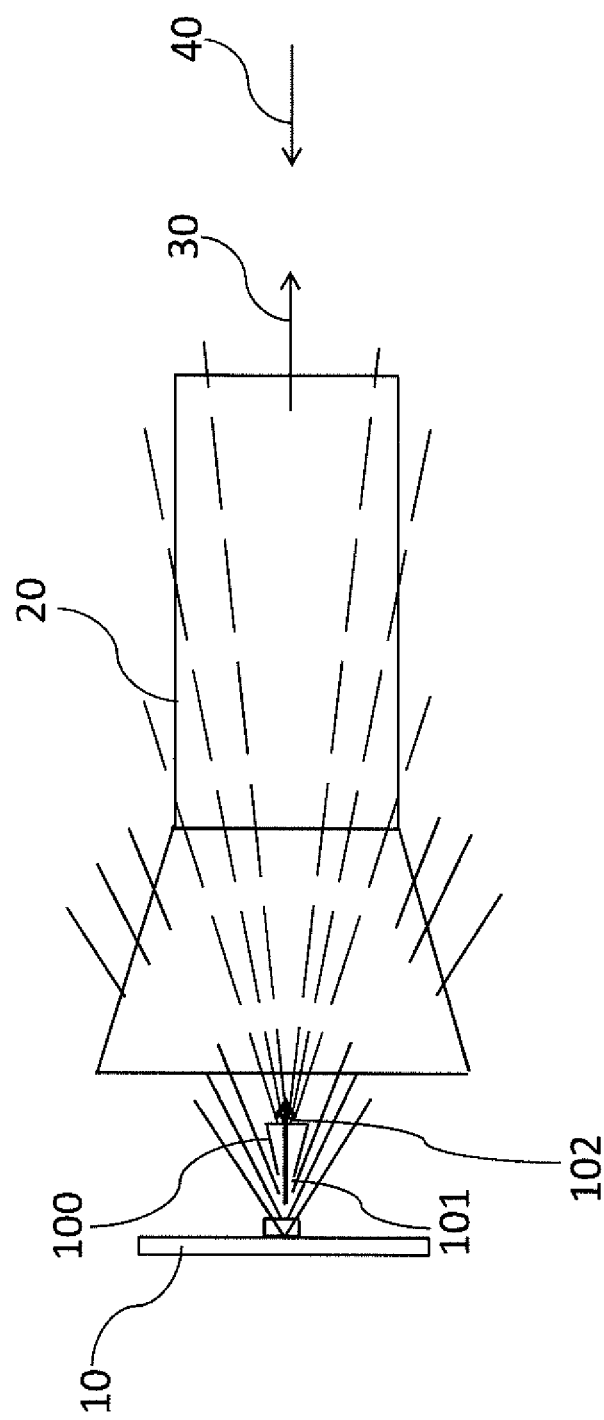
FIG. 5 shows a pulse jet nozzle with a flow control device according to the present invention pulsing a reverse jet of air through a filter cartridge.

A self-cleaning gas filtration system according to the present invention is shown in FIG. 5. In this embodiment, a flow control device 100 is disposed in front of the pulse jet nozzle of the pulse pipe 10. The flow control member may be formed of a hollow body, such as a hollow cone which is open at both ends. The reverse pulse jet of air is discharged from the pulse pipe via the pulse jet nozzle toward the flow control device. The flow control device splits the pulse jet of air into two distinct flow streams, a first distinct flow stream (shown with a bold arrow) that passes through a fluid flow inlet 101 of the flow control device 100 and out of a fluid flow outlet 102 of the flow control device 100, and a second distinct air flow which does not pass through the fluid flow inlet 101 or the fluid flow outlet 102 (shown with wide dashed lines). The first distinct air flow passing through the hollow body is straightened and directed (as shown with tight dashed lines) to the distal section of the filter cartridge 20, whereas the second distinct flow stream (as shown with bolder dashed lines) is re-directed to the proximal end of the filter cartridge 20.

In this manner, filtration surfaces of both the distal and proximal ends of the filter cartridge 20 may be effectively cleaned.

Figure 6:
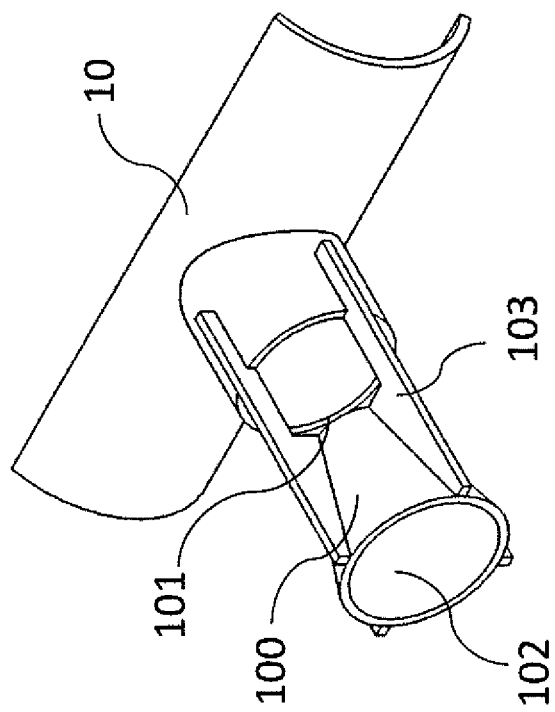
FIG. 6 shows a projection view of a first embodiment of a pulse jet nozzle comprising a flow control device according to the present invention.

A projection view of an embodiment of the flow control device according to the present invention is shown in FIG. 6. In this figure, the flow control device 100 is integrally formed with the pulse jet nozzle of the pulse pipe 10 through use of struts 103 extending between the flow control device 100 and the pulse pipe 10. The inlet 101 of the flow control device 100 is separated from, directed toward and arranged over the outlet of the pulse jet nozzle of the pulse pipe 10. The inlet 101 of the flow control device 100 is smaller than the outlet of the pulse jet nozzle, such that pulse air exiting the pulse jet nozzle is divided into two streams by the flow control device 100, one stream flowing through the inlet 101 of the flow control device 100 and subsequently through the outlet 102 of the flow control device, and the other stream flowing over the outer surface of the flow control device 100. The flow control device of this embodiment may be formed as a hollow truncated cone open at both ends. The hollow cone may have a rotational symmetry about a central axis through the cone. Provision of a flow control device 100 with a central axis, about which central axis the flow control device is rotationally symmetric, allows for the creation of two distinct flows of air which are both also rotationally symmetric, such that the inner surfaces of the filter cartridge 20 may be cleaned with equal effect throughout the filter cartridge 20.

Gaps between the struts 103 may aspirate air from the area surrounding the pulse jet nozzle during the reverse pulse jet of air, to increase the available volume of air for cleaning the cartridge 20.

Figure 7:
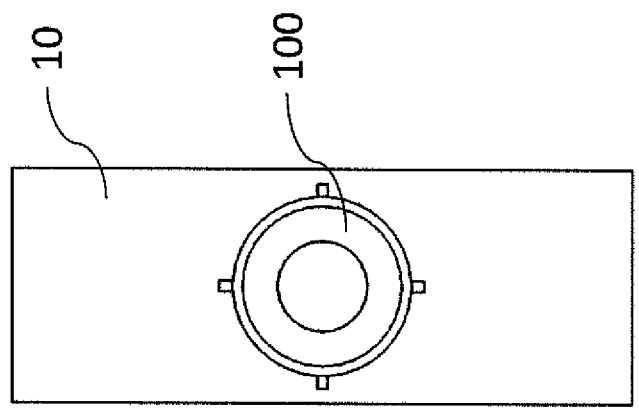
FIG. 7 shows a different projection view of a pulse jet nozzle comprising a flow control device according to the present invention.

FIG. 7 shows another view of this embodiment of the flow control device 100. As can be seen from this view, the flow control device 100 may comprise a hollow, rotationally symmetric body.

Figure 8:
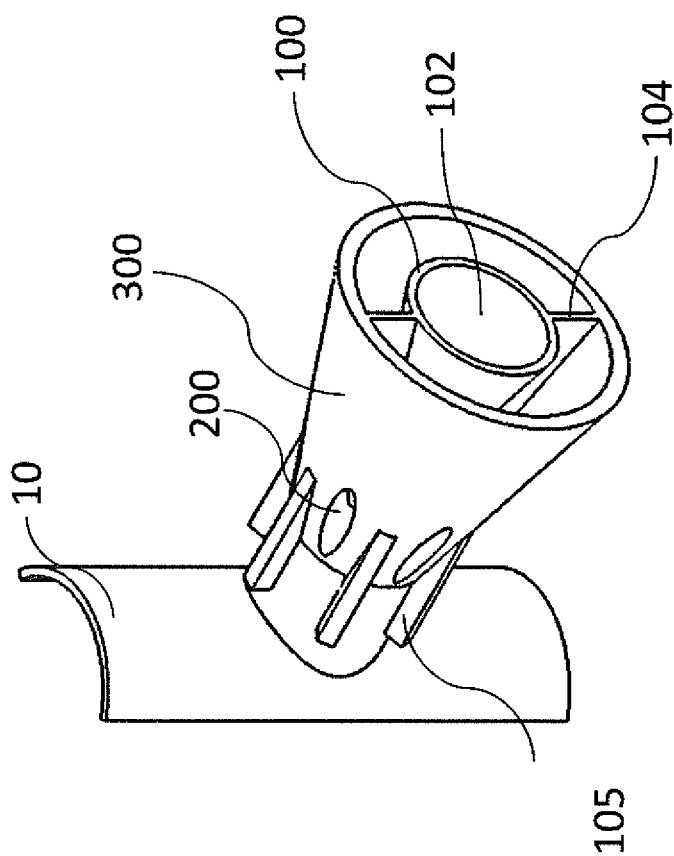
FIG. 8 shows a projection view of a second embodiment of a pulse jet nozzle comprising a flow control device according to the present invention.

Another embodiment of the flow control device according to the present invention is shown in FIG. 8. In FIG. 8, a flow control device 100 having a structure similar to that described with reference to FIGS. 6 and 7 is shown disposed within a housing 300 arranged around the flow control device 100. Where constructional details are not given, reference is made to the structure described with reference to FIGS. 6 and 7.

Although not visible in FIG. 8, the inlet of the flow control device 100 is separated from, directed toward and arranged over the outlet of the pulse jet air nozzle of the pulse pipe 10, and the fluid flow outlet 102 of the flow control device 100 is directed away from the outlet of the pulse jet air nozzle of the pulse pipe 10. In this embodiment, the flow control device 100 is connected to the housing 300 by struts 104. The housing 300 is connected to the pulse jet air nozzle of the pulse pipe 10 through the use of further struts 105, and extends from an outer surface of the pulse nozzle.

Like the flow control device 100, the housing 300 has the form of a cone open at each end. In the present embodiment, the narrower open end of the cone contacts the pulse nozzle. The housing may be integrally formed with the pulse nozzle or may be engageable with the pulse nozzle, for example by means of a friction fit. The housing 300 may support the flow control device 100 over the pulse nozzle, for example by means of internal struts 104 extending between the flow control device 100 and the housing 300.

In this embodiment, the housing 300 is provided with aspirator holes 200. The aspirator holes may be formed in the housing at a location upstream of the inlet 101 of the flow control device 100 arranged in the housing 300, that is, between the outlet of the pulse pipe 10 and the inlet 101 of the flow control device 100. The aspirator holes 200 act to draw in air from the area surrounding the housing via an aspiration effect when the pulse jet air is supplied from the pulse jet nozzle of the pulse pipe 10, to induce a higher volume of air into the reverse pulse jet of air to increase the overall volume of air available for cleaning the filter cartridge 20.

Figure 9:
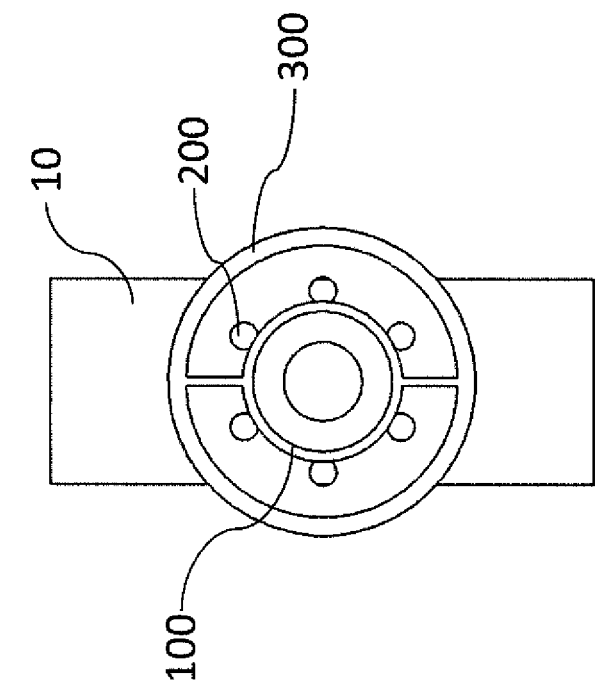
FIG. 9 shows a different projection view of the pulse jet nozzle comprising a flow control according to the present invention.

An alternative view of this second embodiment is shown in FIG. 9, which shows the arrangement of the aspirator holes 200 to have equal shape and size and to be arranged on a circle at equidistant angles about the axis of symmetry of the housing 300. These aspirator holes 200 may also be formed at other locations in the housing. There may be one or more aspirator holes 200. The housing may have a similar or the same symmetry as the flow control device 100.

A pulse pipe with two pulse jet nozzles, each provided with a flow control device 100, is shown in FIG. 10. Each pulse jet nozzle is arranged at a proximal location to a particular filter cartridge 20. The outlets 102 of each flow control device 100 may lie on a central axis of each respective filter cartridge. The pulse pipe may comprise multiple pulse jet nozzles in excess of two.

Figure 11:
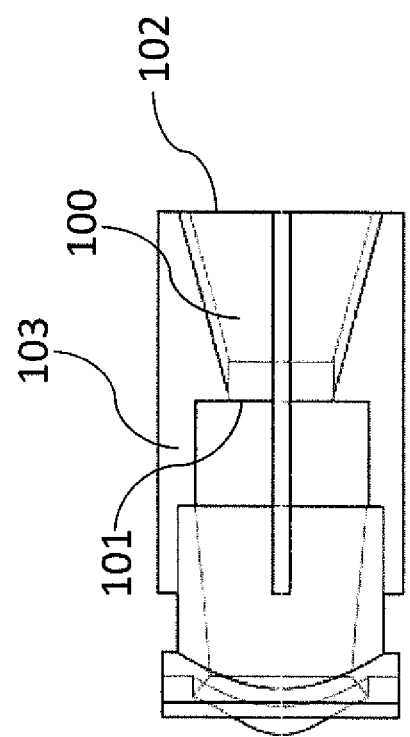

A side view of a flow control device according to the present invention is shown in FIG. 11. As detailed above, the flow control device 100 shown in this Figure comprises a fluid flow inlet 101, a fluid flow outlet 102, and struts 103 to connect the flow control device to the pulse jet nozzle.

Figure 12:
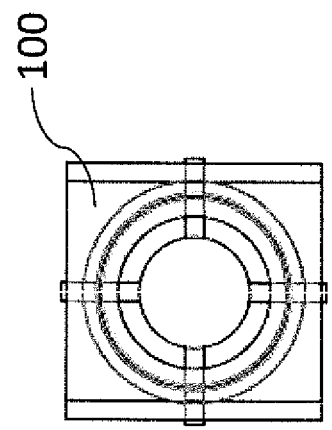
FIGS. 11 to 14 show different views of pulse jet nozzles according to the present invention.

An end view of the flow control device according to the present invention is shown in FIG. 12. As can be seen in FIG. 12, the hollow body of the flow control device has rotational symmetry about a central axis.

Figure 13:
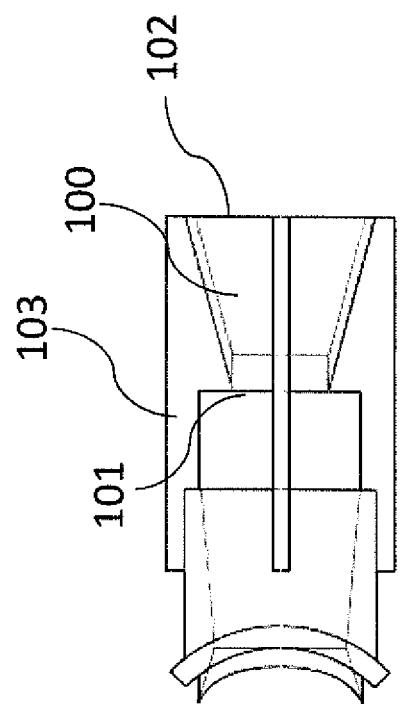

A plan view of the flow control device according to the present invention is shown in FIG. 13. This Figure shows more detail as to how the flow control device is connected to the pulse jet nozzle.

Figure 14:
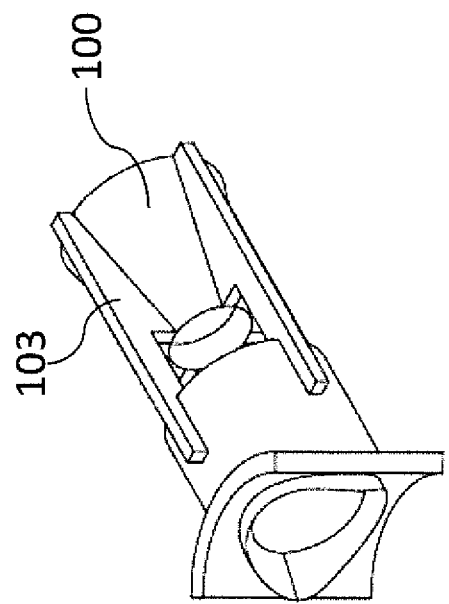

An isometric view of the flow control device is shown in FIG. 14. As can be seen in FIG. 14, the struts 103 may be integrally formed along the length of the flow control device 100, for increased stability.

The above description provides several embodiments of the invention. However, each of these embodiments is susceptible to modifications, as well as alterations in the fabrication materials and equipment.

For example, although rotationally symmetric flow control devices having perfectly rotationally symmetric (in other words, circular) symmetry have been described, for example those having the form of an open cone, a lesser degree of rotational symmetry may also be provided. For example, a modified embodiment may have four-fold rotational symmetry, in the case of flow control device 100 having the shape of a square-based pyramid, or two-fold rotational symmetry, in the case of a flow control device 100 having the shape of a rectangular-based pyramid. The degree of rotational symmetry may be selected to match the rotational symmetry of the filter cartridge with which the flow control device is intended for use. The rotational symmetry may be determined with reference to the hollow body of the flow control device, and may be determined without reference to any aspirators, struts, projections or similar ancillary structures provided to the hollow body. The rotational symmetry may be determined, alternatively, with reference to the symmetry of the air flows downstream of the flow control device.

Further, the flow control device may be constructed from plastic or a metal.

The flow control device may be formed integrally with the pulse jet nozzle of the pulse pipe 10, or may be securable over the pulse jet nozzle of the pulse pipe 10 via a releasable retainer such as a clip or catch, or a friction fitting.

The above description is formulated with respect to the flow of air. However, the term fluid flow may equally apply, in some embodiments, to other gases or liquids.

The flow control device of the present invention may be incorporated into an air filtration system. The flow control device may be incorporated into an air filtration system of a gas turbine.

It is expected that those skilled in the art, having regard to the above description as well as to their own common general knowledge as properly pertaining to their art, will be able to adapt the above-described embodiments to suit local engineering requirements and particular circumstances. Further, it is expected that those skilled in the art will be able to implement the concepts disclosed herein with equivalents or alternatives to the various elements hereinbefore described. All such adaptions and implementations are considered to be embodiments of the present invention to the extent that they fall within the scope of the appended claims.

The invention claimed is:

1. A flow control device adapted to control fluid flow into a filter cartridge, the flow control device comprising:
    a hollow body comprising a fluid flow inlet and a fluid flow outlet; and
    a plurality of struts extending upstream of the fluid flow inlet of the hollow body and configured to connect the flow control device to a pulse nozzle such that the fluid flow inlet of the hollow body is separated from, directed toward, and arranged over an outlet of the pulse nozzle;
    wherein the flow control device is configured to split fluid flowing toward the filter cartridge into at least two distinct flow streams,
        a first distinct flow stream of the at least two distinct flow streams being a flow stream which flows into the hollow body through the fluid flow inlet and out of the hollow body through the fluid flow outlet, and
        a second distinct flow stream of the at least two distinct flow streams being a flow stream which does not flow into the hollow body through the fluid flow inlet and out of the hollow body through the fluid flow outlet;
    wherein the fluid inlet is disposed at an upstream end of the hollow body in the direction of fluid flow; and
    wherein the flow control device comprises a housing disposed around the hollow body, wherein the housing comprises at least one aspirator.

2. The flow control device of claim 1, wherein the fluid flow outlet has a larger area than the fluid flow inlet.

3. The flow control device of claim 1, wherein the hollow body comprises at least one wall, wherein the at least one wall diverges outwardly from the fluid flow inlet to the fluid flow outlet.

4. The flow control device of claim 3, wherein the at least one wall diverges to have a shape selected from the group consisting of a conical shape and a pyramidal shape.

5. The flow control device of claim 1, wherein the fluid outlet is disposed at a downstream end of the hollow body, in the direction of fluid flow.

6. The flow control device of claim 1, wherein the fluid flow inlet and the fluid flow outlet are both positioned on a central axis of symmetry of the hollow body.

7. The flow control device of claim 1, wherein the fluid flow inlet and the fluid flow outlet are sized and positioned such that the first and second distinct flow streams remain substantially distinct at locations distal to the flow control device in the direction of fluid flow.

8. The flow control device of claim 1, wherein the fluid flow outlet is of a sufficient size such that the first distinct flow stream has a sufficient volume for cleaning a distal end of the filter cartridge in the direction of fluid flow.

9. The flow control device of claim 1, wherein the fluid flow inlet and the fluid flow outlet are configured such that the first distinct flow stream is less divergent than the second distinct flow stream.

10. The flow control device of claim 1, wherein the flow control device is integrally formed with the pulse nozzle.

11. The flow control device of claim 1, wherein the flow control device is adapted to be retro-fitted over an existing pulse nozzle.

12. A method of modifying a self-cleaning process gas filtration system, the method comprising retrofitting the flow control device of claim 1 over an existing pulse nozzle.

13. The method of claim 12, wherein the fluid flow outlet has a larger area than the fluid flow inlet.

14. The method of claim 12, wherein the hollow body comprises at least one wall, wherein the at least one wall diverges outwardly from the fluid flow inlet to the fluid flow outlet.

15. The flow control device of claim 6, wherein the hollow body is a hollow truncated cone open at both ends.

16. The flow control device of claim 1, further comprising a second plurality of struts configured to connect the hollow body to the housing.

17. A self-cleaning process gas filtration system, the system comprising:
   a filter cartridge adapted to filter a process gas flow flowing in a process direction;
   a pulse pipe comprising a pulse nozzle, the pulse pipe configured to supply a pulse of cleaning gas through the pulse nozzle in a reverse direction through the filter cartridge relative to the process direction; and
   a flow control device adapted to control the flow of the pulse of cleaning gas, wherein the flow control device is configured to split the pulse of cleaning gas into at least two distinct flow streams;
   wherein the flow control device comprises:
   a hollow body comprising a fluid flow inlet and a fluid flow outlet; and
   a plurality of struts extending upstream of the fluid flow inlet of the hollow body and configured to connect the flow control device to a pulse nozzle such that the fluid flow inlet of the hollow body is separated from, directed toward, and arranged over an outlet of the pulse nozzle;
   wherein a first distinct flow stream of the at least two distinct flow streams is a flow stream which flows into the hollow body through the fluid flow inlet and out of the hollow body through the fluid flow outlet;
   wherein a second distinct flow stream of the at least two distinct flow streams is a flow stream which does not flow into the hollow body through the fluid flow inlet and out of the hollow body through the fluid flow outlet; and
   wherein the fluid inlet is disposed at an upstream end of the hollow body in the direction of fluid flow; and
   wherein the flow control device comprises a housing disposed around the hollow body,
   wherein the housing comprises at least one aspirator.

18. The system of claim 17, wherein the first distinct flow stream is configured to supply a pulse of cleaning gas to at least a distal end of the filter cartridge and the second distinct flow stream is configured to supply a pulse of cleaning gas to at least a proximal end of the filter cartridge.

19. The system of claim 17, wherein the flow control device is configured such that the pulse of cleaning gas controlled by the flow control device exerts a substantially uniform pressure to internal surfaces of the filter cartridge.

\* \* \* \* \*